Nov. 19, 1940. E. G. DANN Re. 21,624

GARMENT CONSTRUCTION

Original Filed April 2, 1934 2 Sheets-Sheet 1

INVENTOR
Ernest G. Dann
BY Blair Curtis & Dunne
ATTORNEYS

Nov. 19, 1940. E. G. DANN Re. 21,624

GARMENT CONSTRUCTION

Original Filed April 2, 1934 2 Sheets-Sheet 2

INVENTOR
Ernest G. Dann
BY Glair Curtis & Dunne
ATTORNEYS

Reissued Nov. 19, 1940 Re. 21,624

UNITED STATES PATENT OFFICE

UNITED STATES PATENT OFFICE 21,624

GARMENT CONSTRUCTION

Ernest G. Dann, New York, N. Y.

Original No. 2,056,773, dated October 6, 1936, Serial No. 718,620, April 2, 1934. Application for reissue January 15, 1940, Serial No. 314,000

2 Claims. (Cl. 2—224)

This invention relates to a garment construction and more particularly to an undergarment designed for the central portion of the body.

One of the objects of this invention is to provide a garment construction which will be simple, practical and thoroughly durable. Another object is to provide a construction of the above character which may be manufactured with a minimum amount of inexpensive materials and a considerable saving in time and labor. Another object is to provide a construction of the above character which, while being attractive in appearance, is extremely comfortable in use. Another object is to provide a construction of the above character which will remain in position about the crotch portion of the body without appreciable relative movement with respect thereto, regardless of the position which the body assumes. Another object is to provide a construction of the above character in which all tendency to bind about the crotch portion of the body is eliminated. Another object is to provide a construction of the above character in which any pressure on the crotch portion of the body necessary to hold the garment in position is diverted to points where it may be withstood with ease and comfort. Another object is to provide a construction of the above character which is light in weight and which fits snugly about the body with no protruding portions. Other objects will be in part obvious and in part pointed out hereinafter.

The invention accordingly consists in the features of construction, combinations of elements and arrangements of parts as will be exemplified in the structure to be hereinafter described, and the scope of the application of which will be indicated in the following claims.

In the accompanying drawings, in which are shown several of the various possible embodiments of my invention, Figure 1 is a front elevational view of the preferred embodiment of my garment in position on the body;

Similar reference characters refer to similar parts throughout the several views of the drawings.

As conducive to a clearer understanding of certain features of this invention, it might here be pointed out that garments of this general character are usually characterized by complexity of construction and the use of an undue amount of material. This not only increases the expense of manufacture but also adds to the labor necessarily involved in laundering or the like. Also these garments are usually made in such a manner that they will only fit one definite size of body and are incapable of adjustment to various sizes. Furthermore, these garments as a rule are not pliable so that they may follow various movements of the body without binding or otherwise causing discomfort to the wearer. A glaring defect noticeably apparent in garments of this general character is the crotch construction and support therefor which often causes great discomfort by way of binding, chafing, and the application of an undue amount of pressure at sensitive points on the body. One of the objects of this invention is to provide a garment construction in which the several difficulties hereinabove mentioned as well as many others are successfully overcome.

Figure 1:
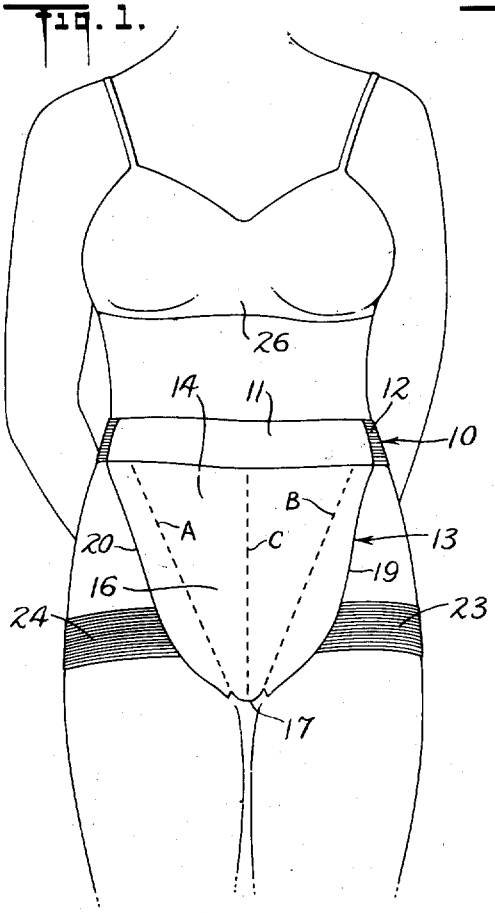
Figure 2:
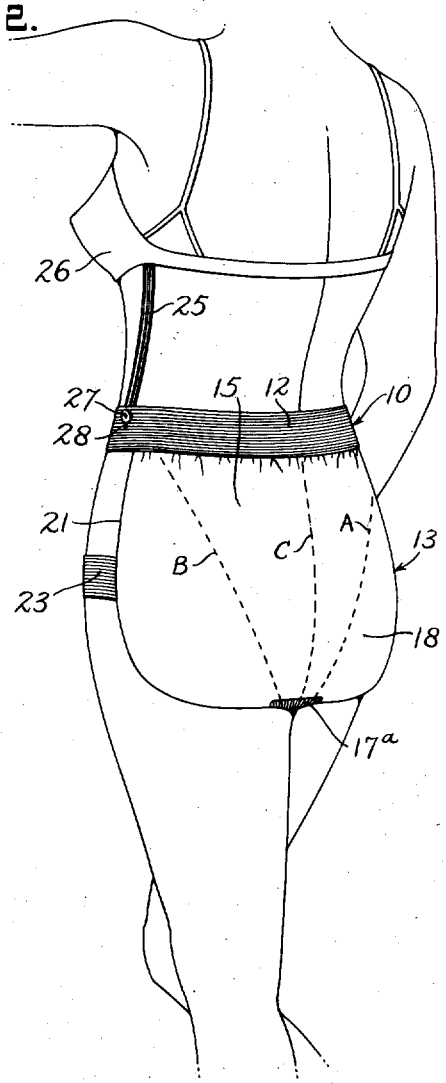
Figure 2 is a rear elevational view of the garment shown in Figure 1.

Referring now to the drawings in detail, there is shown in Figures 1 and 2 a belt generally indicated at 10. Preferably belt 10 comprises an inelastic portion 11 extending across the abdominal region of the body, the remaining portion 12 thereof being elastic in character. Secured to the front and rear sides of belt 10 is a shield member generally indicated at 13.

Thus front end 14 of shield 13 is secured to the lower edge of belt 10 and is preferably equal in width to the length of inelastic portion 11 of belt 10. Shield 13 thence extends downwardly over the abdomen, through the crotch, upwardly over the buttocks (Figure 2), and has its end 15 secured to the lower edge of portion 12 of belt 10. Accordingly, shield 13 comprises in its entirety a front portion 16, a crotch portion 17 and a rear portion 18. Preferably a part 17a of crotch portion 17 is elastic in character so that this part of the garment may be stretched to one side for toilet purposes.

Preferably the edges 19 and 20 of front portion 16 taper inwardly toward the crotch portion, while edges 21 and 22 (Figures 2 and 3) extend outwardly from the crotch to the belt. More particularly, edges 21 and 22 of rear portion 18 extend abruptly in an outward direction from the crotch portion and thence upwardly substantially following a line passing through the hip point but spaced rearwardly therefrom. Thus the rear portion 18 is of greater width than the front portion 16 and covers a substantial portion of each buttock. I have discovered that when rear portion 18 is so designed, the tendency thereof to creep upwardly over the buttocks and to bunch inwardly about the crotch portion is materially eliminated without the use of other staying means.

However, as an additional provision against the tendency of rear portion 18 to ride up in this manner, I prefer to provide a pair of elastic strips 23 and 24, strip 23 being connected to edges 19 and 21 respectively, while strip 24 is connected to edges 20 and 22 respectively. Strips 23 and 24 are substantially spaced from belt 10 and extend about the upper extremities of the legs. Accordingly they exert a tension against the opposite sides of rear portion 18 to hold this part in a laterally extended position, no matter what position the body may assume.

In order to provide for a maximum amount of comfort about the crotch portion of the body, I have discovered that the dimensions of certain portions of shield 13 are very important. To describe these comparative dimensions intelligently, it is necessary to consider three dimensions of the body and corresponding dimensions of the shield covering those portions of the body. Accordingly, I have indicated in Figures 1 and 2, distances A and B which are the lengths of lines passing from the opposite sides of the front portion of the belt, down along the opposite sides of the crotch, and thence upwardly to substantially corresponding points on the rear portion of the belt. Also there is indicated a distance C which is the length of a line extending from the center line of the belt, down through the center of the crotch, and up to a corresponding point on the rear portion of the belt.

The dimensions of shield 13 along the lines A and B have for their minimums the lengths of the corresponding distances on the body. However, the dimension of shield 13 in the vicinity of the line C should be greater than the length of the corresponding distance on the body. In effect this makes the crotch portion 17 of the shield slightly concave with respect to the crotch portion of the body as shown in Figure 1.

Accordingly, when in normal use on the wearer, the bottom edge of the belt 10 usually lies in a single horizontal plane. Thus tension in upward directions on shield 13 is greater in directions substantially along the lines A and B than it is along line C. Accordingly, pressure exerted on the crotch portion of the body by shield 13 is naturally concentrated at the opposite sides of the crotch, whereas the center of crotch portion 17 of the shield exerts very little if any pressure against the central portion of the crotch. In order to have shield 13 rest firmly against the body, and avoid relative movement with respect to the body, it is highly desirable to have certain parts thereof fit snugly against the body. Accordingly shield 13 rests firmly against the side portions of the crotch, exerting any necessary pressure thereagainst where it may be easily withstood, while the center line vicinity of crotch portion 17 exerts very little if any pressure against this portion of the crotch of the body where it might cause discomfort and annoyance.

For purposes of clarity, the term "side-angular distance" as used hereinafter will denote substantially the length of the lines A and B (Figures 1 and 2) on either the body or the shield 13, while the term "center distance" will indicate a distance substantially equal to the line C on either the body or the shield. It will be understood, however, that these distances are not to be limited to the precise positions shown in Figures 1 and 2, but indicate distances in the general vicinity of lines A, B and C. Also the term "side-angular direction" signifies a direction along the lines A or B, and the term "center line direction" indicates a direction substantially along the line C.

Figure 3:
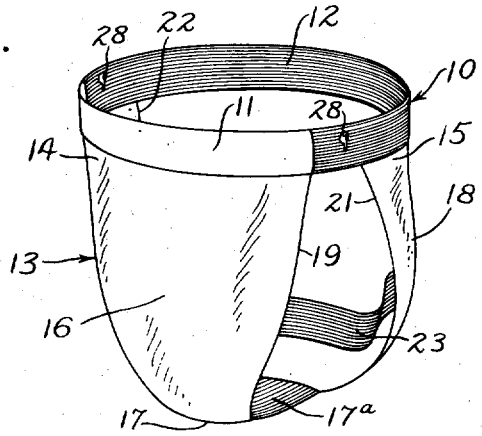
Figure 3 is a perspective view of the garment when removed from the body.

I prefer also to provide an elastic strip 25 preferably secured to a brassière 26 at a point slightly to the rear of the arm pit. The lower end of strip 25 has attached thereto a button 27 adapted to fit within a suitable buttonhole 28 in belt 10. Preferably buttonhole 28 is located in the vicinity of the hip of the wearer, as best shown in Figures 2 and 3. Another elastic strip (not shown), similar in construction and position to strip 25, is secured to the other side of brassière 26 and connected in a like manner to the other side of belt 10. Accordingly, these strips serve as an additional support for belt 10 and help to hold the belt on an even horizontal plane during movement of the body. Of course it is understood that belt 10, due to exaggerated movements of the body, cannot remain on such a horizontal plane at all times. These strips also exert a tension upon belt 10 in side-angular directions. Accordingly, any tension which they exert upon the crotch portion 17 of the shield 13 is concentrated at points on the opposite sides thereof and not at the central portion thereof.

Figure 4:
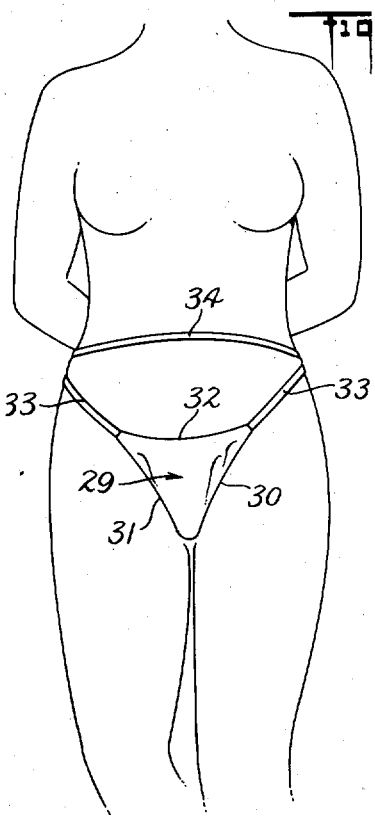
Figure 4 is a front elevational view of another embodiment of my invention in position on the body.
Figure 5:
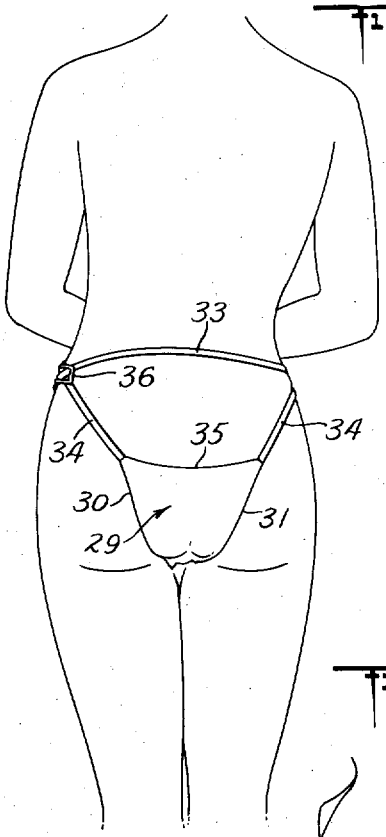
Figure 5 is a rear elevational view of the garment shown in Figure 4 in position on the body.
Figure 6:
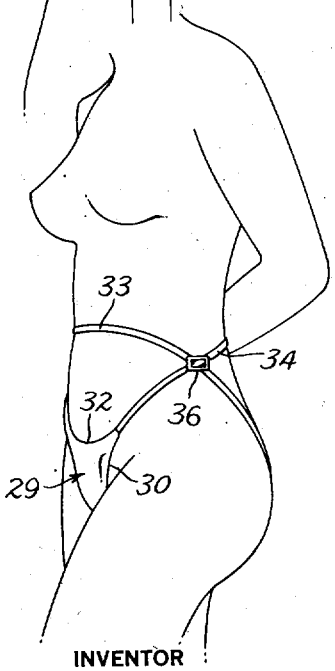
Figure 6 is a side elevational view of the garment shown in Figure 4 in position on the body.

Referring now to Figure 4, in which there is shown another embodiment of my invention, a shield generally indicated at 29 fits about the crotch portion of the body and the parts immediately adjacent thereto. Preferably, although not necessarily, shield 29 is shorter than shield 13 (Figures 1 and 2) and the edges 30 and 31 taper inwardly and outwardly as will be clear from Figures 4, 5 and 6. Accordingly, the narrower portion of shield 29 passes about the crotch portion of the body.

Figure 7:
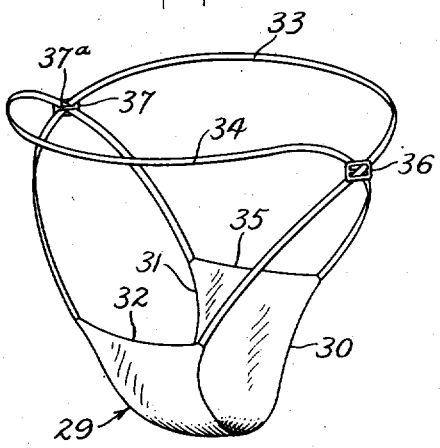
Figure 7 is a perspective view of the garment shown in Figure 4 when removed from the body.

Secured to the opposite sides of the front end 32 of shield 29 are the opposite ends of a strip 33, preferably elastic in character. In a like manner, the opposite ends of an elastic strip 34 are secured to the opposite sides of the rear end 35 of shield 29. As best shown in Figure 7, strips 33 and 34 cross each other when in use so that the extremity of strip 34 passes about the upper abdominal region of the body while the extremity of strip 33 passes about the back and is preferably spaced slightly above the normal waistline.

In order to hold strips 33 and 34 in this crossed relationship, thus to make dressing and undressing less complicated, I prefer to provide a pair of buckle parts 36 and 37 through which each strip passes. Buckle parts 36 and 37 comprise a rectangular body portion (Figure 7) and a portion 37*a* connecting two of the sides thereof. Accordingly, each strip is passed underneath the frame of the buckle and over the portion 37*a* so that each buckle holds the strips substantially in the crossed relationship. Furthermore, buckle parts 36 and 37 may be moved in directions along either of the strips thus to increase or decrease the distance between each buckle and each end of the shield. In this manner the tension of the strips on the opposite ends of the shield may be varied as well as the position of the strips about the body.

It will now be seen that the entire supporting tension of the strips 33 and 34 on the shield 29 is in side-angular directions, while there is no direct pull on the shield in a center line direction. Accordingly the pressure resulting from the tension of the strips 33 and 34, which hold shield 29 firmly and comfortably against the body, is concentrated at the sides of the crotch, while the central crotch portion has very little if any pressure exerted thereagainst. Many of the advantages found in the preferred embodiment of my invention also exist in this embodiment thereof and it has the added advantage of being extremely simple in construction and consequently may be economically manufactured. Also, it may be placed on or removed from the body with extreme ease and washed with a minimum amount of inconvenience. This embodiment of my invention is especially well suited for wear underneath a foundation garment such as a girdle. Due to its compactness and lack of bulk, it may be worn in this manner with ease and a great deal of comfort.

Thus I have provided an undergarment characterized by simplicity of construction and yet so designed as to create a maximum amount of comfort to the wearer. This garment offers a great deal of freedom of bodily movement when worn, without the usual inconvenience common to garments of this general character. Accordingly it will be seen that I have provided a thoroughly practical and efficient construction in which the several objects hereinabove referred to as well as many others are successfully accomplished. It will be understood that I do not intend to limit this invention to undergarments or the like as many features thereof may be adequately embodied in other articles of apparel, as, for example, shorts, pajamas, or the like. Furthermore, the term "shield" as used hereinbefore or hereinafter is to be interpreted in its broadest sense to include any covering body.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In garment construction, in combination, a waistband, a front shield having its upper portion connected to said waistband and adapted to extend down over a substantial portion of the abdomen of the wearer, the lower portion of said shield adjacent the crotch of the wearer being convex, and a rear shield member having its upper edge connected to the rear side of said waistband and shaped to extend down over a substantial portion of the buttocks of the wearer and connected to the convex portion of said front shield to form a crotch portion concave with respect to the crotch of the wearer to create a fullness along the central portion of the garment whereby the supporting stresses of the garment run through the shields in directions from the sides of the crotch portion to points on said waistband in the general vicinity of the hips, said directions being spaced inwardly from the sides of said shields so that binding is eliminated in all portions of the garment.

2. In garment construction, in combination, an elastic waistband which exerts lateral tension at the top of the garment and is adapted to resist downward pull, a front shield having its upper portion connected to said waistband and adapted to extend down over a substantial portion of the abdomen of the wearer, the lower portion of said shield adjacent the crotch of the wearer being convex, and a rear shield member having its upper edge connected to the rear side of said waistband and shaped to extend down over a substantial portion of the buttocks of the wearer and connected to the convex portion of said front shield to form a crotch portion concave with respect to the crotch of the wearer to create a fullness along the central portion of the garment whereby the supporting stresses of the garment run through the shields in directions from the sides of the crotch portion to points on said waistband in the general vicinity of the hips, said directions being spaced inwardly from the sides of said shields so that binding is eliminated in all portions of the garment, and elastic means connecting said shields at the sides above the crotch portion and below the hips, said elastic means being adapted to pass around the thighs of the wearer and exert lateral tension on the shields to make the garment substantially taut fore and aft and maintain the concave shape of the crotch portion in use.

ERNEST G. DANN.